United States Patent [19]

Nomura et al.

[11] Patent Number: 5,659,810
[45] Date of Patent: Aug. 19, 1997

[54] ZOOM LENS BARREL

[75] Inventors: Hiroshi Nomura; Shinsuke Kohmoto; Takamitsu Sasaki, all of Tokyo, Japan

[73] Assignee: Asahi Kogaku Kogyo Kabushiki Kaisha, Tokyo, Japan

[21] Appl. No.: 680,709

[22] Filed: Jul. 11, 1996

Related U.S. Application Data

[63] Continuation of Ser. No. 295,092, Aug. 24, 1994, abandoned.

[30] Foreign Application Priority Data

| Aug. 27, 1993 | [JP] | Japan | 5-212440 |
| Nov. 4, 1993 | [JP] | Japan | 5-275742 |
| Dec. 28, 1993 | [JP] | Japan | 5-338277 |

[51] Int. Cl.$^6$ ............................. G03B 1/18; G02B 15/14
[52] U.S. Cl. ........................ 396/72; 359/695; 359/700; 359/701; 396/85
[58] Field of Search ...................... 354/187, 195.12; 359/695, 700, 701

[56] References Cited

U.S. PATENT DOCUMENTS

| 3,663,093 | 5/1972 | Iida | 354/195.12 |
| 4,558,927 | 12/1985 | Omori et al. | 354/195.12 |
| 4,560,237 | 12/1985 | Ohkura et al. | 350/255 |
| 5,079,577 | 1/1992 | Nomura | 354/286 |
| 5,091,802 | 2/1992 | Imaoka et al. | 354/195.12 |
| 5,144,493 | 9/1992 | Nomura | 354/195.12 |
| 5,164,757 | 11/1992 | Nomura | 354/403 |
| 5,198,932 | 3/1993 | Takamura | 359/695 |
| 5,231,449 | 7/1993 | Nomura | 354/286 |
| 5,245,476 | 9/1993 | Shono | 359/699 |
| 5,262,898 | 11/1993 | Nomura | 354/195.11 |
| 5,270,868 | 12/1993 | Nomura | 354/195.12 |
| 5,302,991 | 4/1994 | Nakayama | 354/195.12 |
| 5,321,462 | 6/1994 | Haraguchi et al. | 354/195.1 |
| 5,329,329 | 7/1994 | Fukushima et al. | 354/195.12 |
| 5,349,475 | 9/1994 | Nomura et al. | 354/403 |
| 5,394,210 | 2/1995 | Nomura et al. | 354/195.12 |
| 5,430,516 | 7/1995 | Uziie et al. | |
| 5,434,714 | 7/1995 | Kohmoto et al. | 354/288 |
| 5,450,242 | 9/1995 | Kohmoto et al. | 359/676 |

FOREIGN PATENT DOCUMENTS

| 0344806 | 12/1989 | European Pat. Off. . |
| 0522681 | 1/1991 | European Pat. Off. . |
| 2645282 | 10/1990 | France . |
| 2223862 | 4/1990 | United Kingdom . |
| 2230354 | 10/1990 | United Kingdom . |
| 2231974 | 11/1990 | United Kingdom . |
| 2237406 | 5/1991 | United Kingdom . |
| 2244567 | 12/1991 | United Kingdom . |
| 2259997 | 3/1993 | United Kingdom . |

OTHER PUBLICATIONS

Preliminary Search Report with Translation Attached.
French Search Report and Annex.
First United Kingdom Search Report of Jul. 11, 1995 in connection with United Kingdom Patent Application No. 9417285.5.
Second United Kingdom Search Report of Jul. 11, 1995 in connection with United Kingdom Patent Application No. 9417285.5.

*Primary Examiner*—Safet Metjahic
*Assistant Examiner*—Michael Dalakis
*Attorney, Agent, or Firm*—Greenblum & Bernstein, P.L.C.

[57] ABSTRACT

A zoom lens barrel is provided having a plurality of lens groups which are moved with respect to one another along a predetermined path. The zoom lens barrel comprises a driving barrel which rotates about an optical axis of the plurality of lens groups and at least three telescoping barrels which are moved in the direction of the optical axis by rotation of the driving barrel. Each telescoping barrel which is mounted on an inner periphery of another telescoping barrel of the telescoping barrels, travels a greater distance along the optical axis direction than the another telescoping barrel. A lens group driving mechanism is provided for moving the plurality of lens groups in the optical axis direction by movement of the at least three telescoping barrels in the optical axis direction.

10 Claims, 13 Drawing Sheets

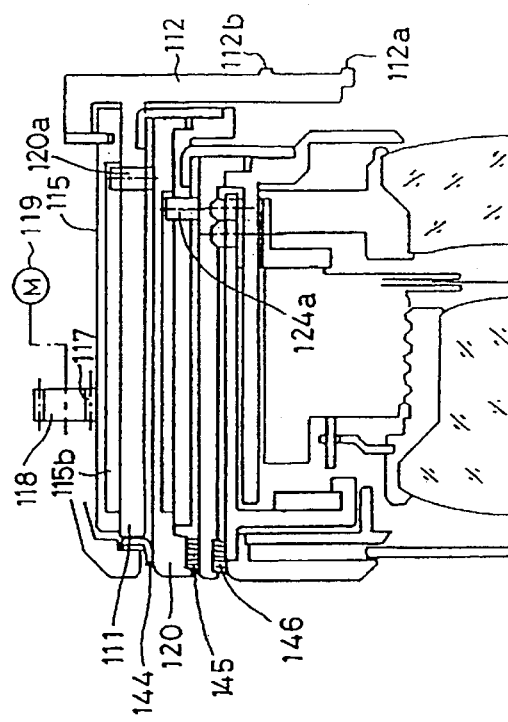
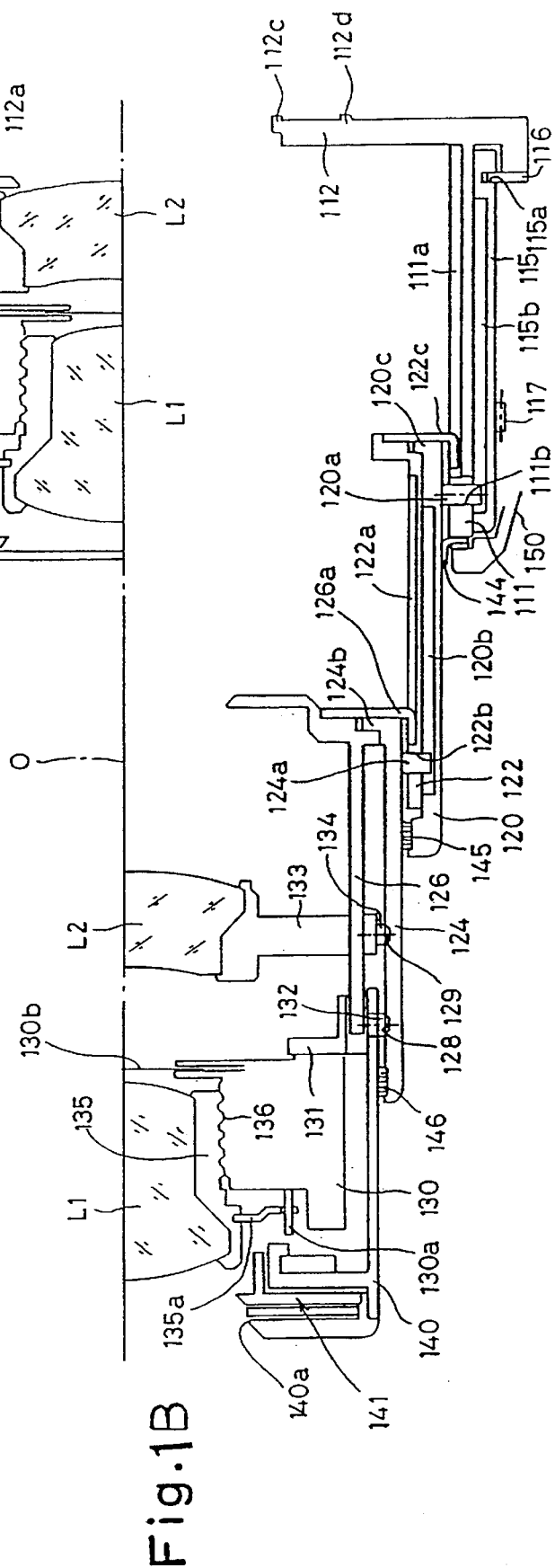
Fig.1A
Fig.1B

ZOOM LENS BARREL

This application is a continuation of application Ser. No. 08/295,092, filed Aug. 24, 1994, now abandoned.

BACKGROUND OF THE INVENTION

1. Field of the Invention

The present invention is directed to a zoom lens barrel for use in a camera. The zoom lens barrel is a telescoping type zoom lens barrel having a plurality of telescoping barrels.

2. Description of Related Art

Recent zoom lens compact cameras are typically provided with a telescoping type zoom lens which includes one or more telescoping barrels which are concentrically. These are projected from and retracted into the camera body when the camera is in use and not in use, respectively, for the purpose of minimizing the length of the retracted zoom lens.

Generally, it is quite difficult to minimize the length of the retracted zoom lens while also realizing a high variable magnification ratio for the zoom lens. If a high variable magnification ratio for the zoom lens is to be achieved, it is difficult to keep the thickness of the camera body compact and small.

SUMMARY OF THE INVENTION

The primary object of the present invention is to provide a telescoping type zoom lens barrel including a plurality of telescoping barrels which are projected from and retracted into the camera body when the camera is in use and not in use, respectively. It is further the object of the present invention to keep the length of the retracted zoom lens compact and small, while realizing a high variable magnification ratio of the zoom lens.

To achieve the object mentioned above, according to the present invention, a zoom lens barrel is provided having a plurality of lens groups which are moved with respect to one another in a predetermined path. The zoom lens barrel comprises a driving barrel which rotates about the optical axis of the plurality of lens groups and, at least three telescoping barrels which are moved in the direction of the optical axis by rotation of the driving barrel. Thus, each of the telescoping barrels which is mounted on an inner periphery of a previous telescoping barrel of the telescoping barrels travels a greater distance in the optical axis direction than the previous telescoping barrel. A lens group driving mechanism is provided for moving the plurality of lens groups in the optical axis direction by movement of the at least three telescoping barrels in the optical axis direction.

With this structure, a minimization of the length of a retracted zoom lens while also a high variable magnification ratio for the zoom lens can be achieved by a telescoping mechanism including three or more telescoping barrels.

According to another aspect of the present invention, a zoom lens barrel is provided having a plurality of lens groups which are moved with respect to one another in a predetermined path. The zoom lens barrel comprises a driving barrel which rotates about the optical axis of the plurality of lens groups, at least two rotating telescoping barrels which are moved in the direction of the optical axis while rotating about the optical axis by rotation of the driving barrel, at least two linear movable telescoping barrels which are moved in the optical axis direction while not rotating about the optical axis by rotation of the driving barrels. The at least two linear movable telescoping barrels support the plurality of lens groups in a manner such that the at least two linear movable telescoping barrels are movable in the optical axis direction with respect to the at least two linear movable telescoping barrels. An inner-most telescoping barrel is provided and is fitted inside one of the at least two rotating telescoping barrels which is closest to the optical axis among the at least two rotating telescoping barrels. Thus the inner-most telescoping barrel is moved in the optical axis direction by rotation of the one of the at least two rotating telescoping barrels with respect thereto. A lens group driving mechanism is provided for moving the plurality of lens groups in the optical axis direction by movement of the at least two rotating telescoping barrels in the optical axis direction.

According to yet another aspect of the present invention, a zoom lens barrel is provided which comprises a rotatable barrel, a first telescoping barrel which is moved in the optical axis direction by rotation of the rotatable barrel, and a second telescoping barrel which is engaged through a screw thread with the first telescoping barrel and is moved in the optical axis direction when rotated. At least two movable lens groups are provided and moved in the optical axis direction by a rotation of the second telescoping barrel. A rotation transmitting mechanism is also provided for transmitting rotation of the rotatable barrel to the second telescoping barrel.

According to yet another aspect of the present invention, a zoom lens barrel is provided which comprises a stationary barrel, a movable lens group including at least front and rear lens groups, a first telescoping barrel which moves in the optical axis direction with respect to the stationary barrel, a second telescoping barrel which moves in the optical axis direction with respect to the first telescoping barrel, and a front lens group supporting barrel which moves in the optical axis direction with respect to the second telescoping barrel, wherein the movable lens group is supported by the front lens group supporting barrel and the second telescoping barrel.

According to yet another aspect of the present invention, zoom lens barrel is provided which comprises a at least two rotatable telescoping barrels and two linear movable telescoping barrels which are concentrically and alternately arranged. The at least two rotatable telescoping barrels are each moved along the optical axis while rotating about the optical axis when rotation is transmitted thereto, wherein the at least two linear movable telescoping barrels are each movable along the optical axis and not rotatable about the optical axis. Further, each of the at least two linear movable telescoping barrels is moved along the optical axis by rotation of one of the at least two rotatable telescoping barrels which is adjacent to the each of the at least two linear movable telescoping barrels. A rotation transmitting mechanism which transmits rotation of one of the at least two rotatable telescoping barrels to another of the at least two rotatable telescoping barrels, and a movable lens group including at least a front lens group and a rear lens group are provided. The front and rear lens groups are supported by one of the at least two rotatable telescoping barrels which projects most, among the at least two rotatable telescoping barrels, and one of the at least two linear movable telescoping barrels, which projects most among said at least two linear movable telescoping barrels.

According to yet another aspect of the present invention, a zoom lens barrel is provided which comprises a a first rotatable telescoping barrel which moves in the optical axis direction when rotation is transmitted thereto, a first linear movable telescoping barrel which is moved in the optical axis direction by rotation of the first rotatable telescoping barrel, a second rotatable telescoping barrel which moves in the optical axis direction when rotation is transmitted thereto, a second linear movable telescoping barrel which supports the first rotatable telescoping barrel and is moved in the optical axis direction by rotation of the second rotatable telescoping barrel, and a rotation transmitting mechanism which transmits rotation of the second rotatable telescoping barrel to the first rotatable telescoping barrel.

The present disclosure relates to subject matter contained in Japanese Patent Applications Ser.No. Hei 5-212440 (filed on Aug. 27, 1993), Hei 5-275742 (filed on Nov. 4, 1993), and Hei 5-338277 (filed on Dec. 28, 1993), which are expressly incorporated herein by reference in their entireties.

BRIEF DESCRIPTION OF THE DRAWINGS

The present invention will be described below in detail with reference to the accompanying drawings, in which;

FIG. 1A and 1B are half cross-sectional views of a telescoping type zoom lens barrel, FIG. 1A shows the retracted state and FIG. 1B shows the maximum extended state thereof, respectively, according to the first embodiment of the present invention;

DESCRIPTION OF THE PREFERRED EMBODIMENT

Figure 2:
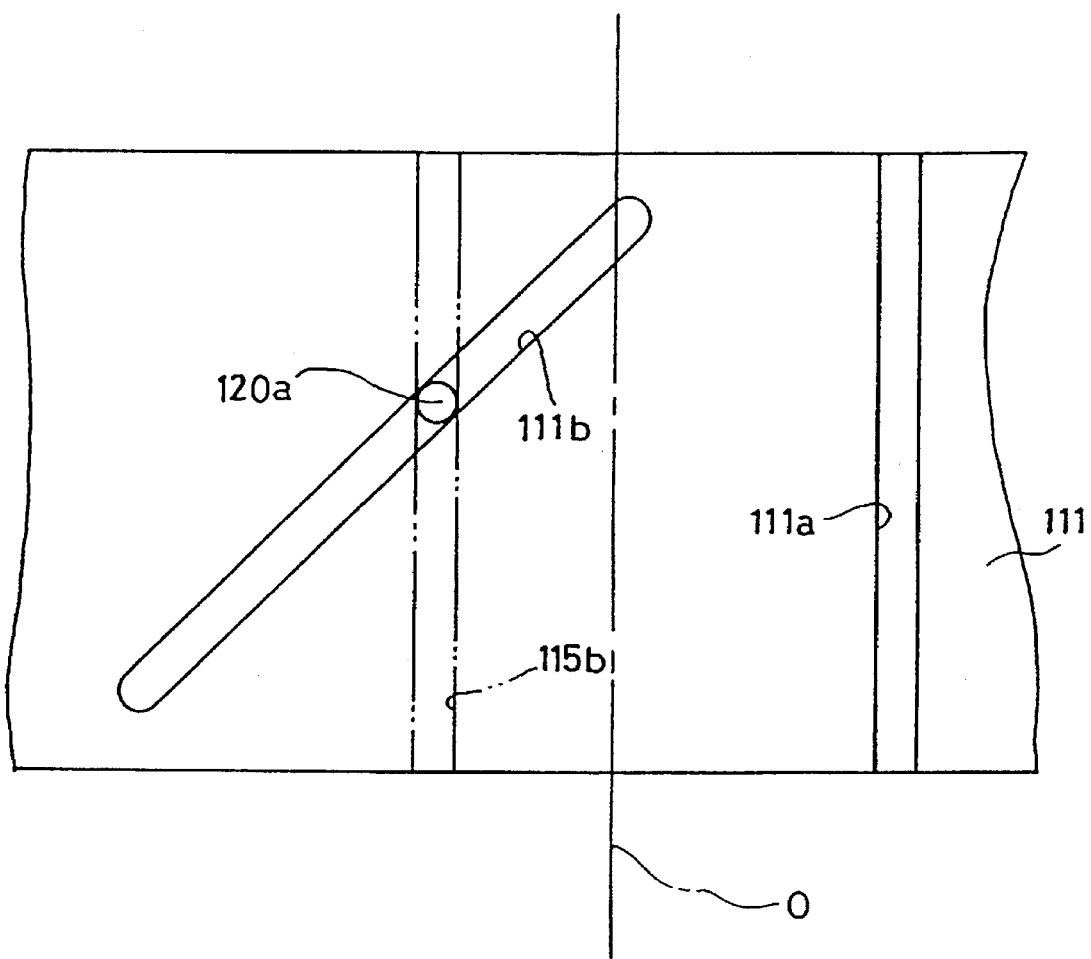
FIG. 2 is a development of part of the stationary barrel of the telescoping type zoom lens barrel shown in FIG. 1, showing the relationship between the leading slot and the linear guiding groove which are formed on the stationary barrel.
Figure 3:
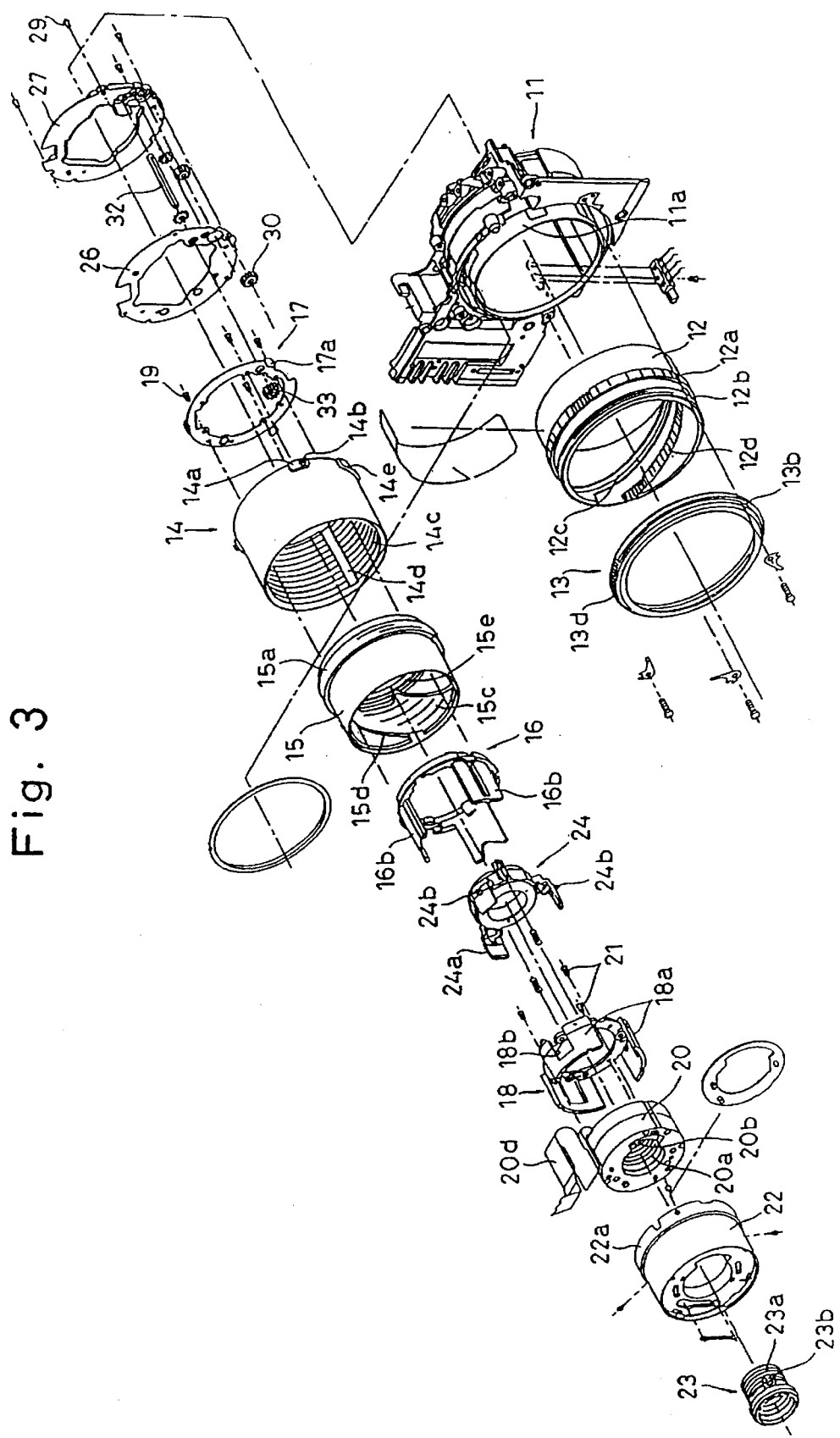
FIG. 3 is an exploded isometric view of a telescoping type zoom lens barrel of the second embodiment of the present invention.
Figure 4:
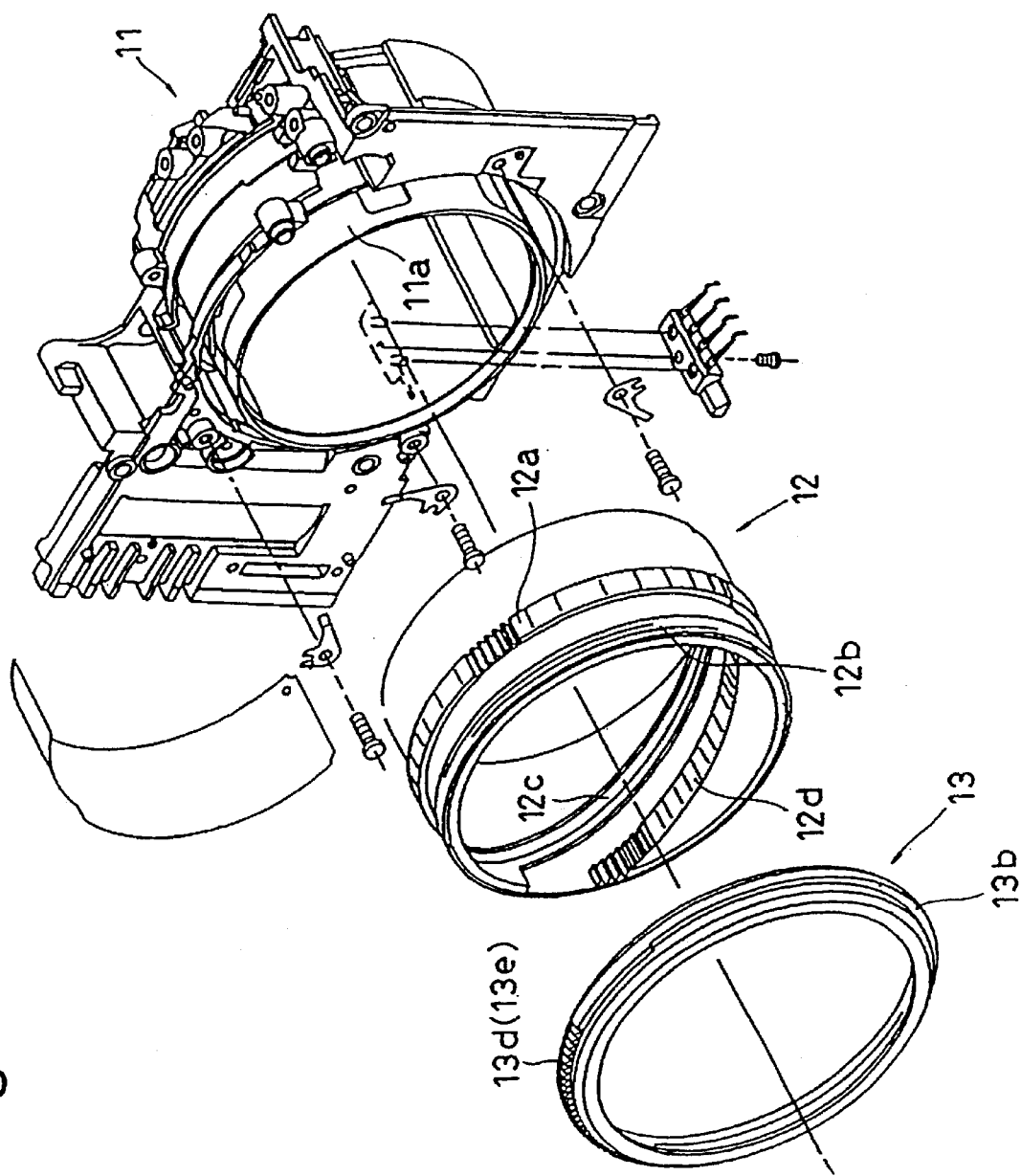
FIG. 4 is an exploded isometric view of a rear portion of the telescoping type zoom lens barrel shown in FIG. 3.
Figure 5:
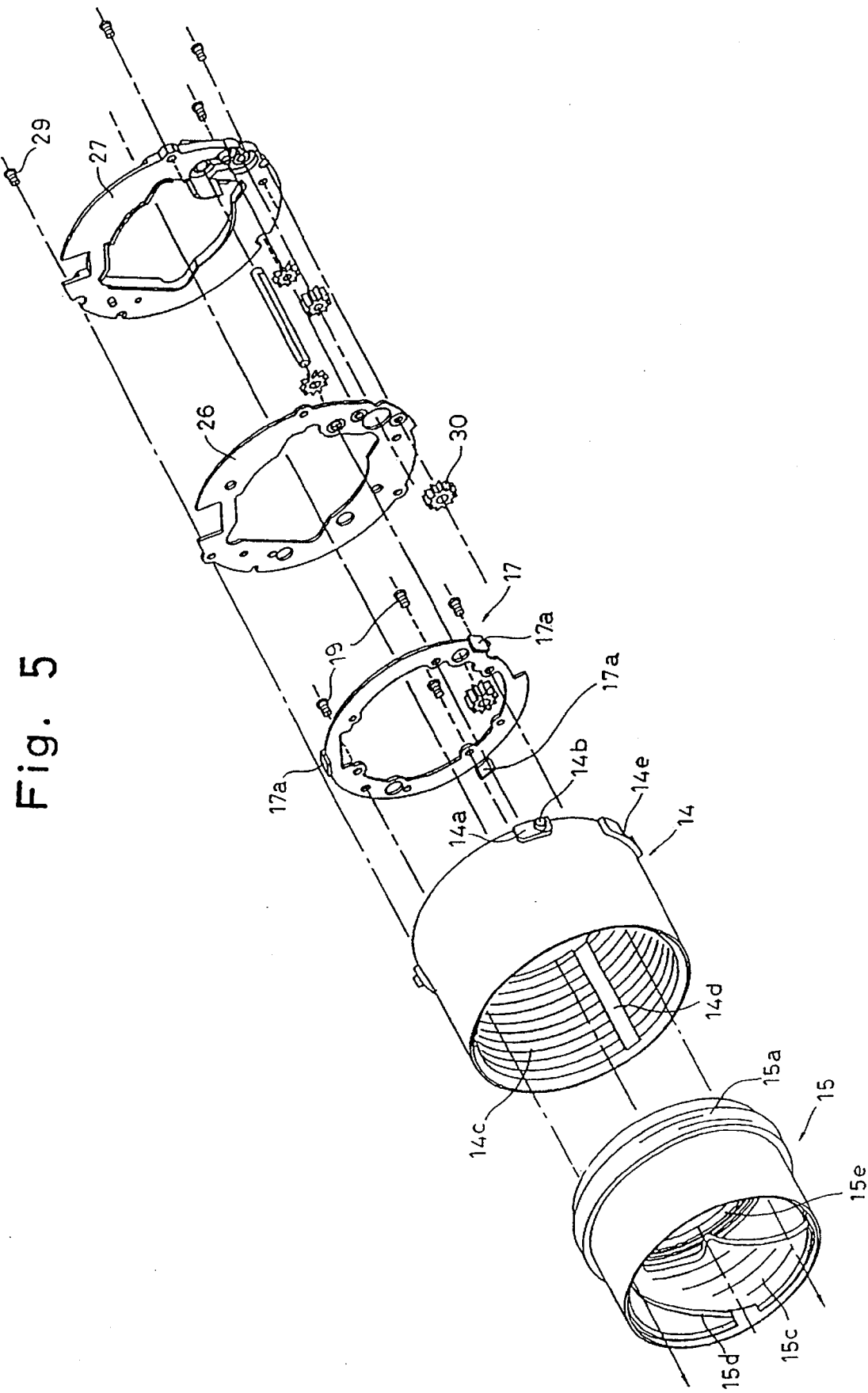
FIG. 5 is an exploded isometric view of a middle portion of the telescoping type zoom lens barrel shown in FIG. 3.
Figure 6:
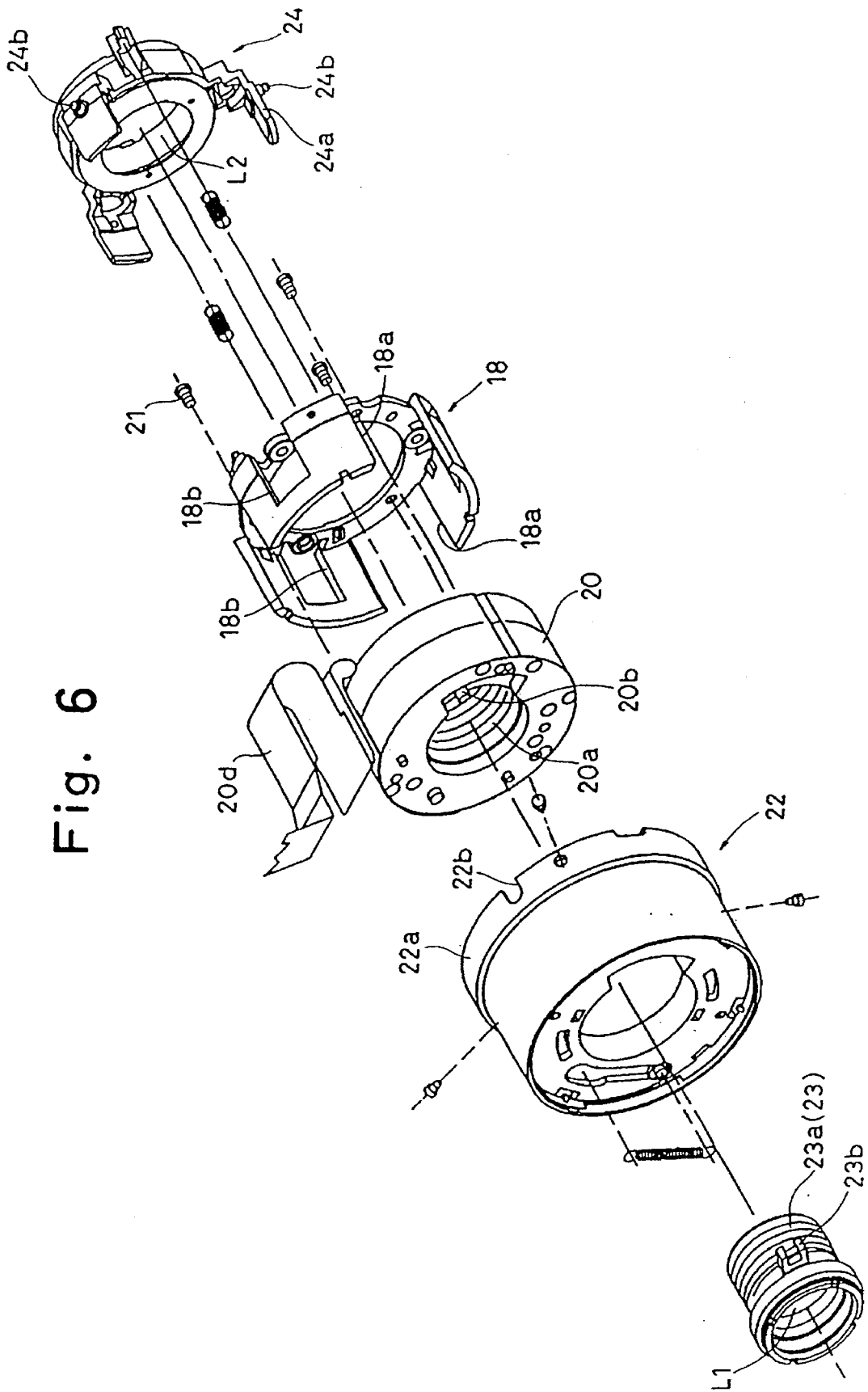
FIG. 6 is an exploded isometric view of a front portion of the telescoping type zoom lens barrel shown in FIG. 3.
Figure 7:
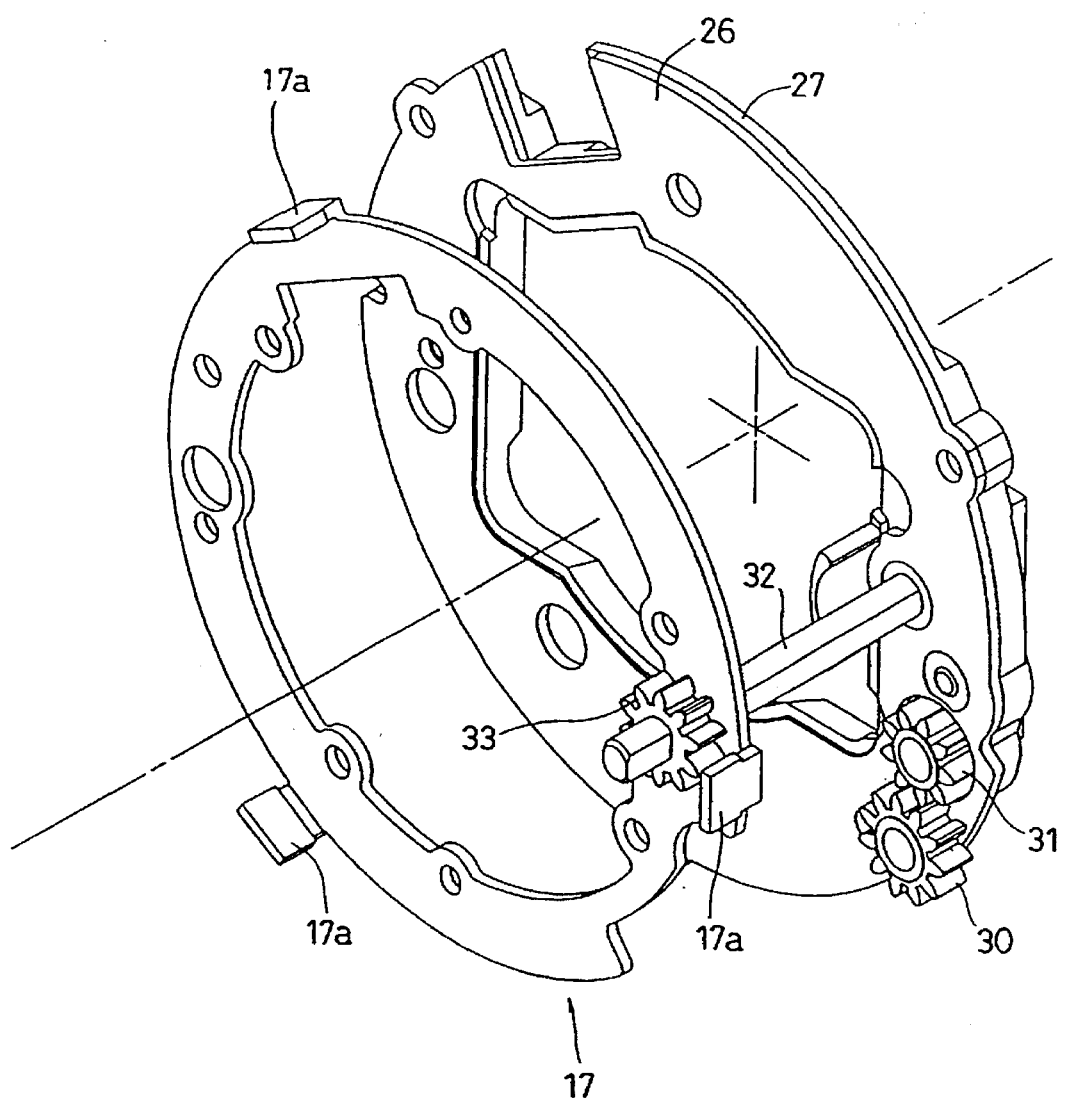
FIG. 7 is an isometric view of the primary part of a driving mechanism for the telescoping type zoom lens barrel, according to the second embodiment of the present invention.
Figure 8:
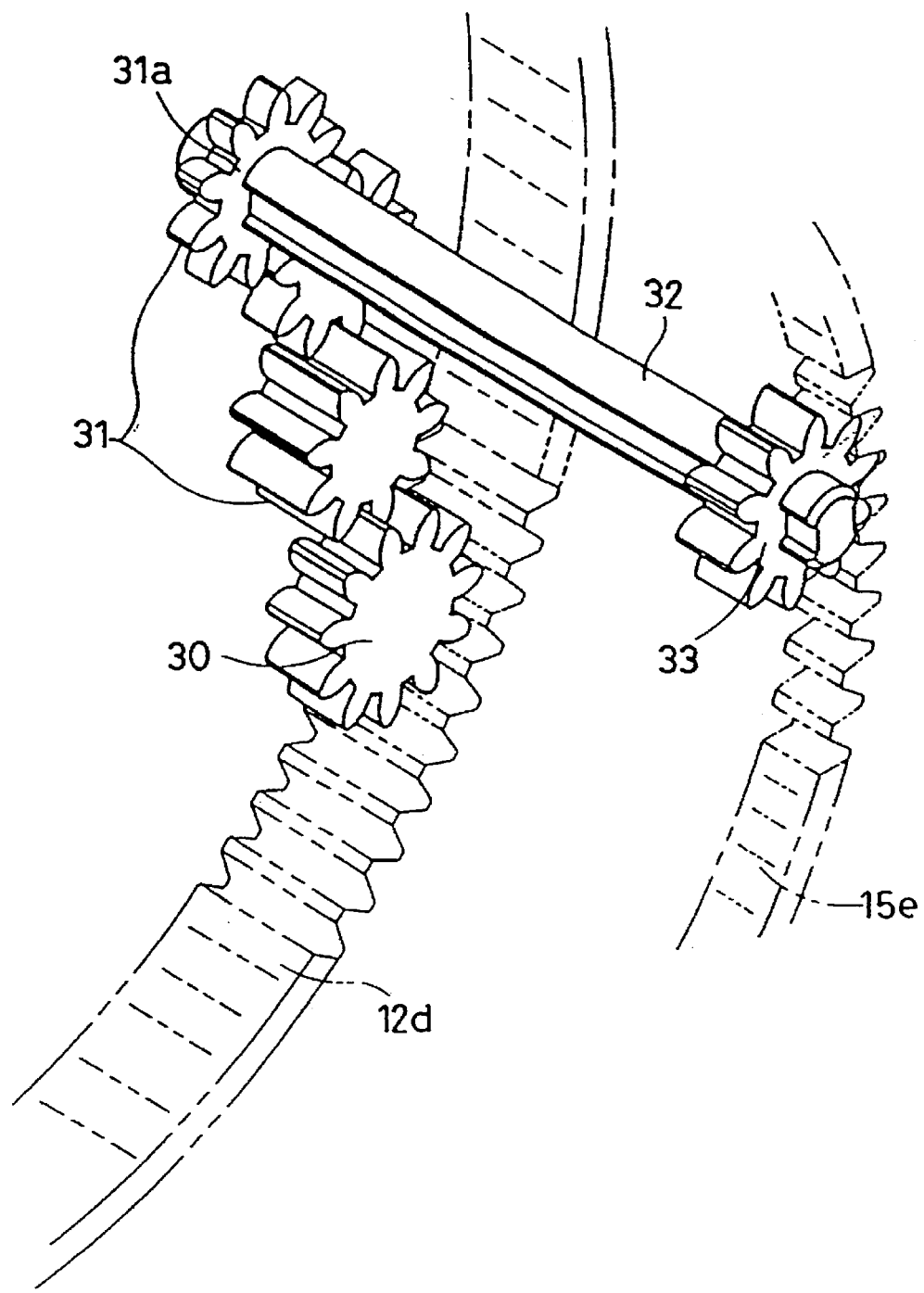
FIG. 8 is an isometric view of the shaft, gears and pinions of the driving mechanism, showing the state of the engagement thereof.
Figure 9:
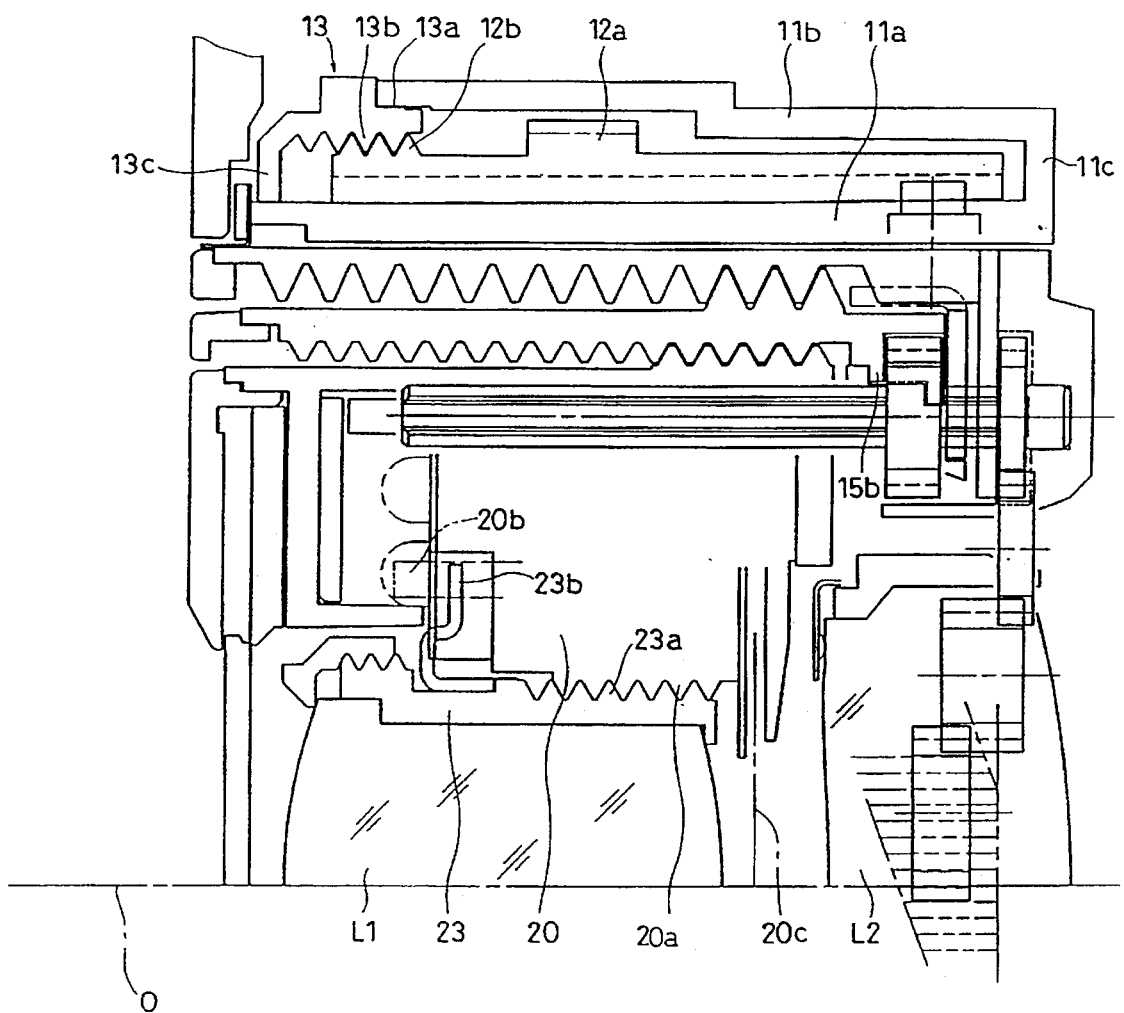
FIG. 9 is a half cross-sectional view of the telescoping type zoom lens barrel, showing the telescoping type zoom lens barrel in the retracted state thereof, according to the second embodiment of the present invention.
Figure 10:
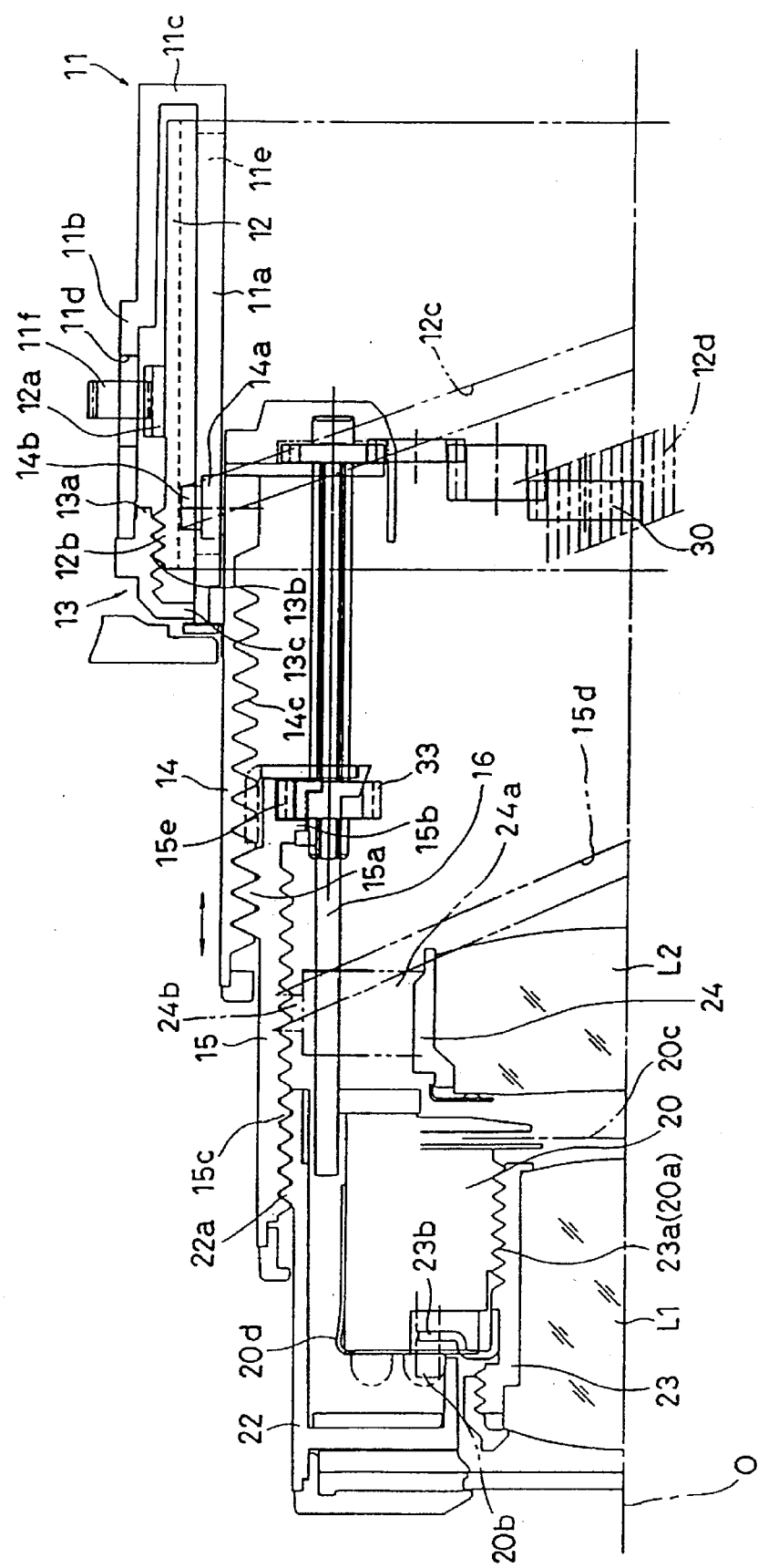
FIG. 10 is a half cross sectional view of the telescoping type zoom lens barrel, showing the telescoping type zoom lens barrel in the most extended state thereof, according to the second embodiment of the present invention.

FIGS. 1A, 1B and 2 show a telescoping type zoom lens barrel according to the first embodiment of the present invention. A stationary barrel 111 is fixed to a stationary portion of a camera body (not shown). The stationary barrel 111 is formed integral to the aperture plate 112 at the rear end thereof. The aperture plate 112 has four linear rails; inner guiding rails 112a and 112c and outer guiding rails 112b and 112d at the upper and lower portions thereof, respectively, for guiding a photographing film (not shown). A linear guiding groove 111a which extends parallel to the optical axis 0 is formed on the inner periphery of the stationary barrel 111. A leading slot 111b is formed on the stationary barrel 111. The leading slot 111b is formed as a linear slot as shown in FIG. 2 which inclines with respect to both the optical axis direction 0 and a circumferential direction of the stationary barrel 111.

A driving barrel 115 is slidably attached to the outside of the stationary barrel 111. The driving barrel 115 has a circumferential groove 115a on its rear portion. A restriction ring 116 which is fixed to the aperture plate 112 is held against the circumferential groove 115a. With this structure, the driving barrel 115 is able to rotate about the optical axis 0 but the movement of the driving barrel 115 in the optical axis direction is prevented by the restriction ring 116. A rotation transmitting groove 115b which extends parallel to the optical axis 0 is formed on the inner periphery of the driving barrel 115. A sector gear 117 is formed on the outer periphery of the driving barrel 115. A pinion 118 which is rotated by a motor 119 is engaged with the sector gear 117.

A third telescoping barrel 120 is slidably fitted inside the stationary barrel 111. A rotation transmitting pin 120a is fixed to the third telescoping barrel 120. The rotation transmitting pin 120a passes through the leading slot 111b and fits into the rotation transmitting groove 115b. With this structure, when the driving barrel 115 rotates, this rotation is transmitted to the third telescoping barrel 120 through the rotation transmitting groove 115b and the rotation transmitting pin 120a, thus the third telescoping barrel 120 moves in the optical axis direction while rotating in accordance with the profile of the leading slot 111b. A rotation transmitting groove 120b which extends parallel to the optical axis 0 is formed on the inner periphery of the third telescoping barrel 120.

A first linear moving member 122 is slidably fitted inside the third telescoping barrel 120. An inner flange 120c is formed at the rear end of the third telescoping barrel 120. The inner flange 120c is held between a rear portion of the first linear moving member 122 and a linear guiding member 122c fixed to the first linear moving member 122. With this structure, the first linear moving member 122 is relatively rotatable with respect to the third telescoping barrel 120 and movable together with the third telescoping barrel 120 in the optical axis direction 0. The linear guiding member 122c runs along the linear guiding groove 111a of the stationary barrel 111. Therefore, when the third telescoping barrel 120 moves in the optical axis direction 0 while rotating, the first linear moving member 122 moves together with the third telescoping barrel 120 in the optical axis direction 0 without rotating but with a relative rotation with respect to the third telescoping barrel 120. A linear guiding groove 122a which extends parallel to the optical axis 0 is formed on the inner periphery of the first linear moving member 122. A leading slot 122b is formed on the first linear moving member 122. The leading slot 122b is formed as a linear slot which inclines with respect to both the optical axis direction 0 and a circumferential direction of the first linear moving member 122.

A second telescoping barrel (i.e., second inner-most telescoping barrel or cam ring) 124 is slidably fitted inside the first linear moving member 122. The mechanical structure between the first linear moving member 122 and the second telescoping barrel 124 is basically the same as that between the stationary barrel 111 and the third telescoping barrel 120. Namely, a rotation transmitting pin 124a, which passes through the leading slot 122b of the first linear moving member 122 and is fitted in the rotation transmitting groove 120b of the third telescoping barrel 120, is fixed to the second telescoping barrel 124. With this structure, when the third telescoping barrel 120 is rotated, this rotation is transmitted to the second telescoping barrel 124 through the rotation transmitting groove 120b and the rotation transmitting pin 124a, thus the second telescoping barrel 124 moves in the optical axis direction 0 while rotating in accordance with the profile of the leading groove 122b.

A second linear moving member 126 is slidably fitted inside the second telescoping barrel 124. The mechanical structure between the second linear moving member 126 and the second telescoping barrel 124 is basically the same as that between the first linear moving member 122 and the third telescoping barrel 120. Namely, an inner flange 124b is formed at the rear end of the second telescoping barrel 124 and is firmly held between the rear portion of the second linear moving member 126 and the linear guiding member 126a fixed to the second linear moving member 126. With this structure, the second linear moving member 126 is relatively rotatable with respect to the second telescoping barrel 124 and movable together with the second telescoping barrel 124 in the optical axis direction 0. The linear guiding member 126a runs along the linear guiding groove 122a of the first linear moving member 122. Therefore, when the second telescoping barrel 124 moves in the optical axis direction 0 while rotating, the second linear moving member 126 moves together with the second telescoping barrel 124 in the optical axis direction 0 without rotating but with a relative rotation with respect to the second telescoping barrel 124.

Cam grooves 128 and 129 for moving front and rear lens groups L1 and L2 in the optical axis direction 0 in a predetermined relationship, respectively, are formed on the inner periphery of the second telescoping barrel 124. A cam pin 132 is fitted in the cam groove 128. The cam pin 132 is fixed to a supporting frame 131 which supports an annular-shaped shutter block 130 immovably with respect to the supporting frame 131. A cam pin 134 is fitted in the cam groove 129. The cam pin 134 is fixed to a supporting frame 133 which supports the rear lens group L2. The second linear moving member 126 supports the supporting frames 131 and 133 in a manner such that the supporting frames 131 and 133 are not rotatable but movable only in the optical axis direction 0. The cam grooves 128 and 129 together with the composite movement of the rotational movement of the second telescoping barrel 124 and the linear movement of the first linear moving member 122 and the second linear moving member 126 give the front and rear lens groups L1 and L2 a predetermined path, thereby the focal length is continuously varied.

The inner periphery of the shutter block 130 meshes with the outer periphery of a lens supporting frame 135 through helicoids 136. A lever 135a which is fixed to the lens supporting frame 135, is engaged with a lens driving pin 130a of the shutter block 130. The lens driving pin 130a is driven to rotate by a predetermined amount in accordance with an object distance, thereby the lens supporting frame 135, i.e., the front lens group L1, is moved in the optical axis direction 0 through the helicoids 136 for focusing. The shutter block 130 includes shutter blades 130b which are opened and closed in accordance with the brightness of the object being photographed.

A first telescoping barrel (i.e., inner-most telescoping barrel) 140 in which the front lens group L1 is mounted, is fixed to the supporting frame 131. The first telescoping barrel 140 is provided at the front end with a lens protection mechanism 141. The lens protection mechanism 141 has a plurality of blades which are opened so as to expose the photographing aperture 140a and closed to cover the same.

Numerals 144, 145, and 146 designate light intercepting members which are provided between the stationary barrel 111 and the third telescoping barrel 120, between the third telescoping barrel 120 and the second telescoping barrel 124, and between the second telescoping barrel 124 and the first telescoping barrel 140, respectively. The purpose of the intercepting members is to prevent light from coming inside the lens barrel. Numeral 150 designates a cover which is integral with a camera body (not shown).

The telescoping type zoom lens barrel according to the first embodiment of the present invention is actuated as follows. When the zoom lens barrel is retracted, as shown in the half cross sectional view of FIG. 1A, the rotation of the pinion 118 by the motor 119 in the forward direction causes the driving barrel 115 to rotate. This rotation of the driving barrel 115 causes the third and second telescoping barrels 120 and 124 to move forward in the optical axis direction 0 while rotating by the same rotational angle as that of the driving barrel 115, through the engagement of the rotation transmitting groove 115b and the rotation transmitting pin 120a and the engagement of the rotation transmitting groove 120b and the rotation transmitting pin 124a. Since the rotation transmitting pin 120a which is fixed to the third telescoping barrel 120 is fitted in the leading slot 111b, the third telescoping barrel 120 moves in the optical axis direction 0 while rotating in accordance with the profile of the leading slot 111b. This movement of the third telescoping barrel 120 in the optical axis direction 0 is transmitted to the first linear moving member 122 whose rotational movement is prevented.

When the rotation of the third telescoping barrel 120 is transmitted to the second telescoping barrel 124, the second telescoping barrel 124 moves in the optical axis direction 0 while rotating in accordance with the profile of the leading slot 122b. This movement of the second telescoping barrel 124 in the optical axis direction 0 is transmitted to the second linear moving member 126 whose rotational movement is prevented. The second linear moving member 126 guides the supporting frames 131 and 133, that is, the front and rear lens groups L1 and L2 movable only in the optical axis direction 0, and the positions of the supporting frames 131 and 133 in the optical axis direction 0 are determined by the cam grooves 128 and 129, which are formed on the inner periphery of the second telescoping barrel 124. Consequently, the front and rear lens groups L1 and L2 are moved in the optical axis direction 0 in a predetermined relationship to effect zooming by the composite movement of the linear movement of the first and second linear moving members 122 and 126 and the rotational movement of the second telescoping barrel 124 including the cam grooves 128 and 129.

Half cross sectional view of FIG. 1B shows the position of the zoom lens barrel of the first embodiment in which the front and rear lens groups L1 and L2 are fully extended, by the above-explained actions. As can be seen in FIG. 1B, the zoom extension is significantly larger in the fully extended position when compared with the fully retracted position.

The shortest focal length at which a picture can be taken exists in a state of the zoom lens barrel between the state shown in FIG. 1A and the position shown in FIG. 1B. A picture can be taken, namely, a focusing and exposing operation can be effected at any focal length between the above-noted shortest focal length and the longest focal length which the zoom lens barrel of FIG. 1B has. When the zoom lens barrel is in the state shown in the half cross sectional view of FIG. 1B, the rotation of the pinion 118 by the motor 119 in the reverse direction causes the zoom lens barrel to be brought into the state shown in the half sectional view of FIG. 1A, that is, the retracted state, by reversing the above-mentioned steps.

Although the telescoping type zoom lens barrel of the first embodiment is a type of zoom lens barrel having three telescoping barrels, i.e., the first, second, and third telescoping barrels 140, 124, and 120, respectively the number of telescoping barrels may be more than three by adopting the same mechanical structure possessed by this zoom lens barrel. The easiest way to increase the number of telescoping barrels is to increase the number of 120 type and 122 type elements used together.

Moreover, although the telescoping type zoom lens barrel of the first embodiment is a type of zoom lens barrel which has a zooming optical system consisting of front and rear lens groups, the present invention may be applied to a telescoping type zoom lens barrel which has a zooming optical system consisting of more than two lens groups.

Furthermore, although the supporting frame 131, to which the first telescoping barrel 140 is fixed, is moved with respect to the second telescoping barrel 124 in the optical axis direction O by a cam mechanism including the cam groove 128 and the cam pin 132, instead of the cam mechanism, the supporting frame 131 may be moved with respect to the second telescoping barrel 124 by using a helicoid mechanism therebetween.

FIGS. 3 through 10 show a telescoping type zoom lens barrel having three telescoping barrels, according to the second embodiment of the present invention. A zoom lens optical system of this second embodiment consists of a first lens group L1 and a second lens group L2. The first lens group L1 is a lens group for focusing. Namely, the first lens group L1 moves in the optical axis direction O with respect to the second lens group L2 to bring the zoom lens optical system into an in-focus state.

A stationary barrel 11 which is fixed to a camera body (not shown) includes an inner barrel 11a, an outer barrel 11b, and a connecting wall 11c which connects the rear end of the inner barrel 11a (FIG. 9) with the rear end of the outer barrel 11b. A rotatable barrel (i.e., driving barrel) 12 is rotatably placed between the outer and inner barrels 11a and 11b. A linear guiding slot 11e which extends parallel to the optical axis 0 is formed on the inner barrel 11a.

A gear portion 12a which extends in a circumferential direction of the rotatable barrel 12 is formed on the outer periphery of the rotatable barrel 12. A minute-pitch male screw portion 12b is formed on the outer periphery of the rotatable barrel 12 at the front end thereof. A leading groove 12c which inclines with respect to a circumferential direction of the rotatable barrel 12 and an inner gear 12d which extends parallel to the leading groove 12c are formed on the inner periphery of the rotatable barrel 12.

A supporting ring 13 is fixed to the front ends of the inner and outer barrels 11a and 11b. The supporting ring 13 includes an engaging portion 13a which comes in contact with the inner periphery of the outer barrel 11b, a female screw portion 13b which is engaged with the male screw portion 12b, and a contacting portion 13c which comes in contact with the outer periphery of the inner barrel 11a. The supporting ring 13 is biased toward the stationary barrel 11 by a biasing member (not shown), so that the position of the supporting ring 13 with respect to the stationary barrel 11 is maintained. A gear portion 13d is formed on a part of the outer peripheral edge of the supporting ring 13. The strength of the stationary barrel 11, specifically that of the front end thereof, is increased by the supporting ring 13.

A slot 11d through which a pinion 11f is engaged with the gear portion 12a is formed on the outer barrel 11b. A slot (not shown) through which a pin 14b passes to fit in the leading groove 12c and through which a pinion 30 is engaged with the inner gear 12d is formed on the inner barrel 11a.

A third telescoping barrel 14 which moves in the optical axis direction O is fitted inside the inner barrel 11a. A guiding projection 14a which is inserted into the linear guiding slot 11e is formed on the outer periphery of the third telescoping barrel 14. A pin 14b which is inserted into the leading groove 12c is formed on the guiding protection 14a. A female helicoid 14c and a linear guiding groove 14d which extends parallel to the optical axis 0 are formed on the inner periphery of the third telescoping barrel 14. With this structure, when the rotatable barrel 12 is rotated, the third telescoping barrel 14 is moved in the optical axis direction 0 while not rotating in accordance with the linear guiding slot 11e and the leading groove 12c.

A second telescoping barrel (i.e., second inner-most telescoping barrel or cam ring) 15 is engaged through a screw thread with the third telescoping barrel 14. The second telescoping barrel 15 is moved in the optical axis direction 0 by the rotation of the third telescoping barrel 14. A male helicoid 15a which meshes with the female helicoid 14c of the third telescoping barrel 14 is formed on the second telescoping barrel 15 on the outer periphery at a rear portion thereof. A linear guiding member 16 placed in the second telescoping barrel 15. A gear supporting/linear guiding plate 17 is fixed to the rear end of the linear guiding member 16 by screws 19. The second telescoping barrel 15 is provided with an inner flange 15b which is held between the linear guiding member 16 and the linear guiding plate 17 in a rotatable manner with respect to the linear guiding member 16 and the linear guiding plate 17. A linear moving key 17a formed on the linear guiding plate 17 is fitted into the linear guiding groove 14d of the third telescoping barrel 14. With this structure, the second telescoping barrel 15 is rotatable with respect to the third telescoping barrel 14 and the rotation of the linear guiding member 16 and the linear guiding plate 17 with respect to the third telescoping barrel 14 is prevented. Accordingly, when rotated, the second telescoping barrel 15 is moved in the optical axis direction 0 while rotating by the function of the male and female helicolds 15a and 14c while the linear guiding member 16 and the linear guiding plate 17 move together with the second telescoping barrel 15 in the optical axis direction 0 without rotating.

Linear moving keys 16b which extend parallel to the optical axis 0 are formed on the linear guiding member 16. Linear moving keys 18a which extend parallel to the optical axis 0 are formed on a front lens group guiding member 18. The linear moving keys 18a are slidably engaged with the linear moving keys 16b in the optical axis direction 0. A shutter block 20 is fixed to the front lens group guiding member 18 by screws 21. The shutter block 20 is fixed to a first telescoping barrel (i.e., inner-most telescoping barrel or front lens group supporting barrel) 22. Hence, the shutter block 20 and the first telescoping barrel 22 are not rotatable but movable in the optical axis direction 0.

The shutter block 20 is provided on the inner periphery thereof with a female helicoid 20a which meshes with a male helicoid 23a formed on the outer periphery of a front lens group supporting frame 23 supporting the first lens group L1. As is well-known, in accordance with an object distance information obtained from an object distance measuring device (not shown), the shutter block 20 drives the front lens group supporting frame 23 to rotate through a driving pin 20b of the shutter block 20 and an engaging projection 23b fixed to the front lens group supporting frame 23 so as to move the front lens group L1 through the male and female helicoids 23a and 20a for focusing. A male helicoid 22a (FIG. 10) which is engaged with a female helicoid 15c of the second telescoping barrel 15 is formed on the outer periphery at the rear end of the first telescoping barrel 22. The shutter block 20 is provided with shutter blades 20c which are opened and closed in accordance with the brightness of an object being photographed, as obtained from a photometering device (not shown). Driving signals are given to the shutter block 20 through a printed circuit board 20d.

Rear lens group guiding slots 18b are formed on the front lens group guiding member 18. The rear lens group L2 is fixed to a rear lens group supporting frame 24. The rear lens group supporting frame 24 is provided with linear keys 24a which are fitted into their respective rear lens group guiding slots 18b. A cam pin 24b is formed on each of the linear keys 24a.

The female helicoid 15c which is engaged with the male helicoid 22a and cam grooves 15d in which the respective cam pins 24b are fitted are formed on the inner periphery of the second telescoping barrel 15 in a manner such that the cam grooves 15d are formed on the female helicoid 15c. When the telescoping barrel of this embodiment is assembled, the cam pins 24b are first fitted in grooves 22b which are formed on the rear end of the first telescoping barrel 22. Thereafter, the cam pins 24b are fitted in the respective cam grooves 15d and the male helicoid 22a is engaged with the female helicoid 15c. With this structure, when the second telescoping barrel 15 rotates, the first telescoping barrel 22 together with the front lens group L1 is moved in the optical axis direction 0 by the functions of the male and female helicoids 22a and 15c and of the linear moving keys 16b and 18a while the rear lens group supporting frame 24 together with rear lens group L2 is moved in the optical axis direction 0 with respect to the front lens group L1 by the functions of the cam grooves 15d and the cam pins 24b and of the linear moving keys 24a and the rear lens group guiding slots 18b, thereby to effect zooming.

A driving mechanism which gives rotation to the second telescoping barrel 15 will be explained below. Basically, this driving mechanism transmits rotation of the rotatable barrel 12 to the second telescoping barrel 15. Gear supporting plates 26 and 27 are fixed to a rear potion of the third telescoping barrel 14 by screws 29. The gear supporting plate 26 supports a pinion (i.e., first pinion) 30 which is engaged with the inner gear (i.e., first inner gear) 12d of the rotatable barrel 12 in a rotatable manner. The pinion 30 is placed in a recess 14e which is formed on the rear end of the third telescoping barrel 14. A part of the tooth portion of the pinion 30 projects out of the outer periphery of the third telescoping barrel 14. Since the inner gear 12d of the rotatable barrel 12 is formed in a manner such that the inner gear 12d is parallel to the leading groove 12c, the engagement of the pinion 30 with the inner gear 12d is maintained even when the third telescoping barrel 14 is moved in the optical axis direction 0 by the rotation of the rotatable barrel 12. A gear train 31 that receives rotation from the pinion 30 is supported between the gear supporting plates 26 and 27. A final gear 31a of the gear train 31 is fixed on a rear portion of a rotation transmitting shaft 32 extending parallel to the optical axis 0. The rotation transmitting shaft 32 has a uniform noncircular-shaped cross section throughout its length.

A pinion (i.e., second pinion) 33 which is slidable on the rotation transmitting shaft 32 and rotatable together with the rotation transmitting shaft 32 is supported by the linear guiding plate 17, with the pinion 33 immovable in the optical axis direction with respect to the linear guiding plate 17. Thus, the pinion 33 moves together with the linear guiding plate 17 and the second telescoping barrel 15 in the optical axis direction 0. The pinion 33 is engaged with an inner gear (i.e., second inner gear) 15e formed on the inner periphery of the second telescoping barrel 15. Accordingly, the rotation of the rotatable barrel 12 is transmitted to the second telescoping barrel 15 through a rotation transmitting mechanism 48 which includes the inner gear 12d, pinion 30, gear train 31, rotation transmitting shaft 32, pinion 33, and inner gear 15e, no matter where the third telescoping barrel 14 is located in the optical axis direction 0.

In the telescoping type zoom lens barrel of this second embodiment, it can be seen from the foregoing that the rotation of the rotatable barrel 12 causes the third telescoping barrel 14 to move in the optical axis direction 0 and the second telescoping barrel 15 to rotate. This rotation of the second telescoping barrel 15 causes the front and rear lens groups L1 and L2 to move in the optical axis direction 0 while varying the distance therebetween in a predetermined relationship thereby to effect zooming.

Figure 11:
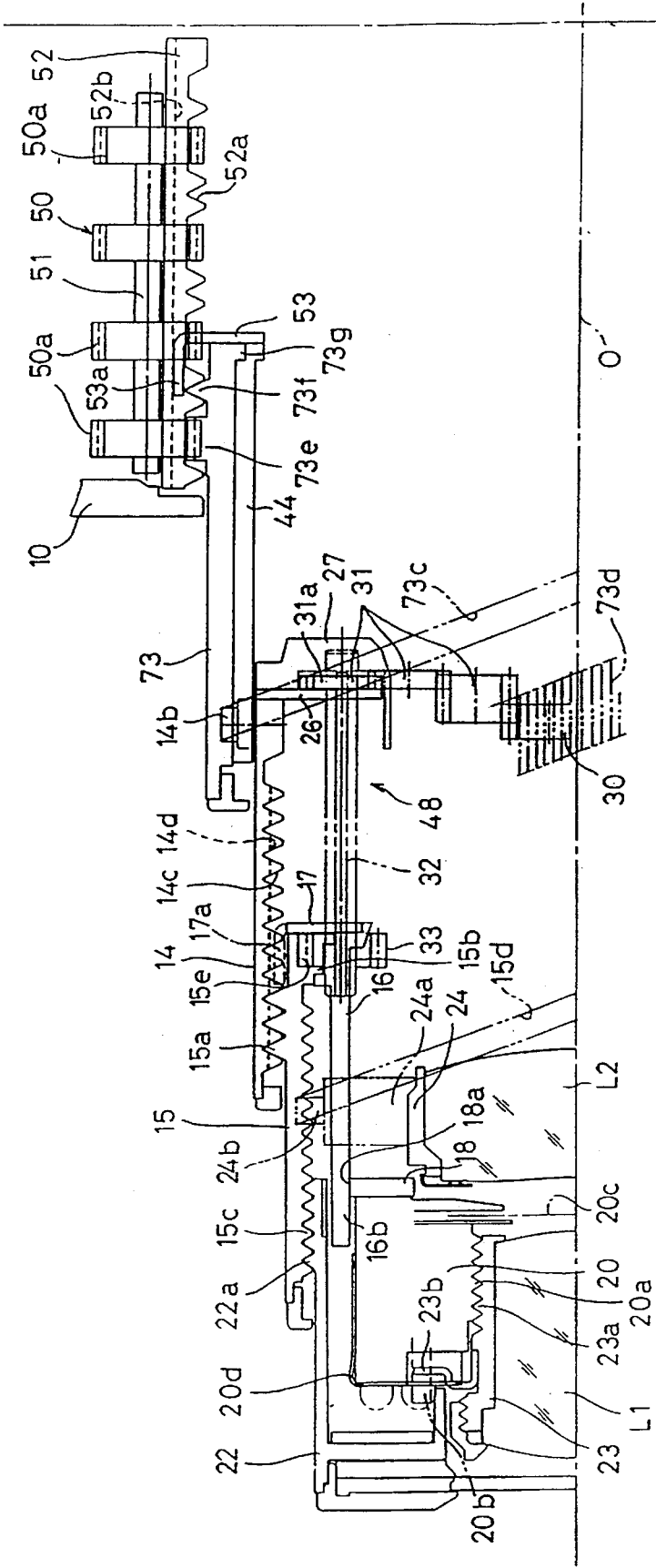
FIG. 11 is a half cross-sectional view of a telescoping type zoom lens barrel, showing the telescoping type zoom lens barrel in the most extended state thereof, according to the third embodiment of the present invention.
Figure 12:
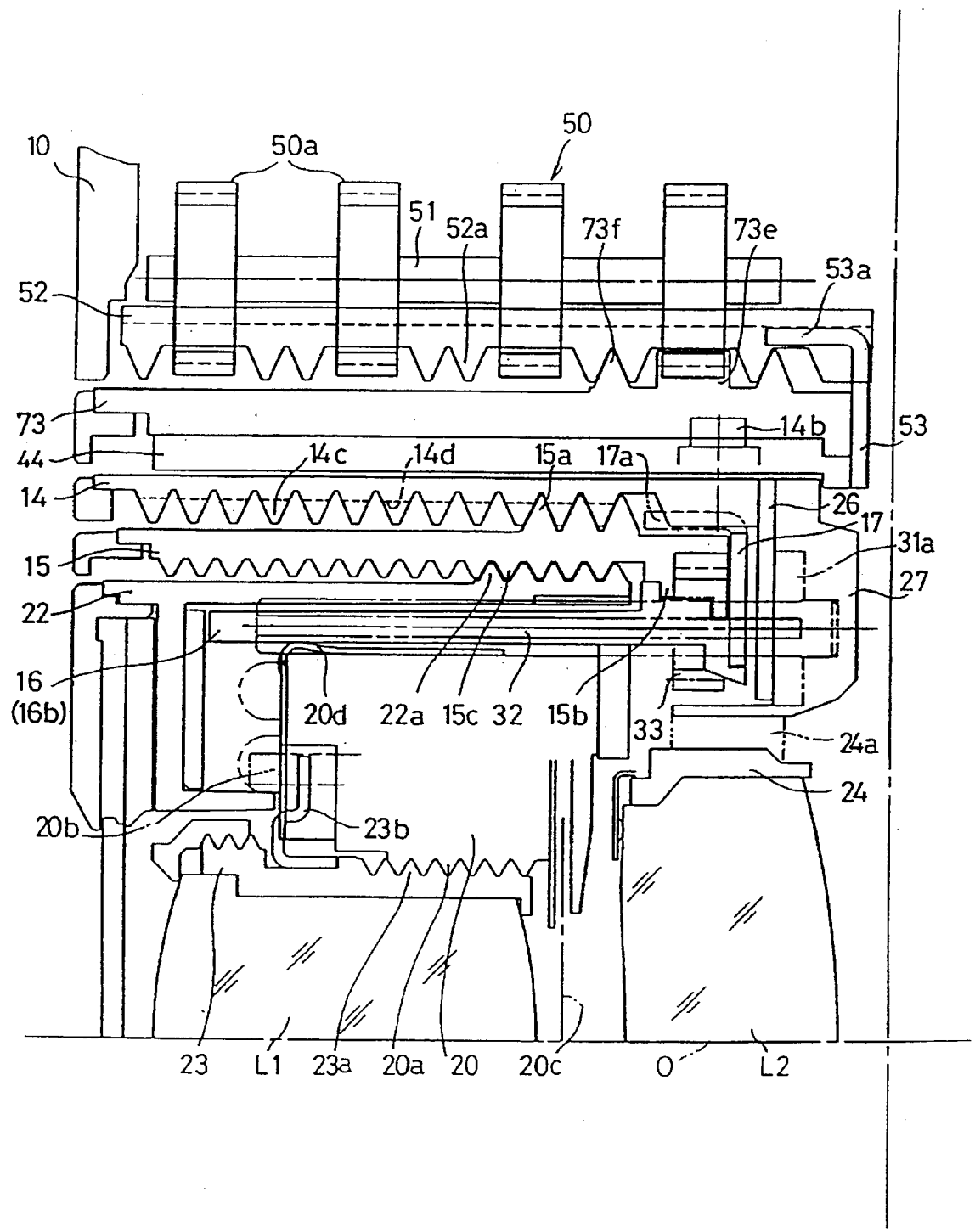
FIG. 12 is a half cross-sectional view of a telescoping type zoom lens barrel, showing the telescoping type zoom lens barrel in the retracted state thereof, according to the third embodiment of the present invention; and, FIG. 13 is a half cross-sectional view of a telescoping type zoom lens barrel, showing the telescoping type zoom lens barrel in the most extended state thereof, according to the fourth embodiment of the present invention.

FIGS. 11 and 12 show a telescoping type zoom lens barrel having four telescoping barrels, according to the third embodiment of the present invention. In this third embodiment, the parts or members which are the same as those in the second embodiment are designated by the same numerals. In addition, the first, second, and third telescoping barrels 22, 15, and 14, including the associated members thereof, are the same as those in the second embodiment.

A stationary barrel 52 is fixed to a camera body 10. A female helicoid 52a and a linear guiding groove 52b which is parallel to the optical axis 0 are formed on the inner periphery of the stationary barrel 52. A driving gear 50 including a plurality of pinions 50a and a shaft 51 is placed parallel to the optical axis 0 and is supported on the stationary barrel 52. The plurality of pinions 50a each have the same shape and are fixed on the shaft 51 at equal intervals. The shaft 51 is rotatably supported by the stationary barrel 52. Predetermined portions of the plurality of pinions 50a are placed inside the stationary barrel 52 through a slot (not shown) which is formed on the stationary barrel 52 and extends parallel to the optical axis 0.

A fourth telescoping barrel (i.e., second rotatable telescoping barrel) 73 is placed in the stationary barrel 52. When rotated, the fourth telescoping barrel 73 moves in the optical axis direction 0. The fourth telescoping barrel 73 is provided at a rear circumferential portion thereof with a male helicoid 73f and an outer gear 73e. The male helicoid 73f and the outer gear 73e mesh with the female helicoid 52a and the driving gear 50, respectively. Each tooth of the male helicoid 73f inclines with respect to a circumferential direction of the stationary barrel 52. The outer gear 73e is formed in a manner such that the outer gear 73e inclines with respect to a circumferential direction of the stationary barrel 52 and extends parallel to the teeth of the male helicoid 73f, in order to be engaged with the plurality of pinions 50a in a proper manner when the fourth telescoping barrel 73 moves in the optical axis direction 0. The fourth telescoping barrel 73 is further provided on the inner periphery thereof with a leading groove 73c and an inner gear 73d, which are similar to the leading groove 12c and the inner gear 12d of the second embodiment. The leading groove 73c inclines with respect to a circumferential direction of the fourth telescoping barrel 73. The inner gear 73d is formed parallel to the leading groove 73c.

The fourth telescoping barrel 73 is provided on the inner periphery thereof with a linear guiding member 44 having a linear guiding slot (not shown). A linear guiding plate 53 is fixed to the rear end of the linear guiding member 44 by screws (not shown) with a flange 73g held between the rear end of the linear guiding member 44 and the linear guiding plate 53. The linear guiding plate 53 has a key portion 53a extending parallel to the optical axis 0. The key portion 53a is fitted into the linear guiding groove 52b. With this construction, the fourth telescoping barrel 73 is rotatable with respect to the stationary barrel 52, and the rotation of the linear guiding members 44 and 53 with respect to stationary barrel 52 is prevented. Thus, when rotated, the fourth telescoping barrel 73 is moved in the optical axis direction 0 by the rotation of the male and female helicoids 73f and 52a while the linear guiding member 44 and the linear guiding plate 53 move together with the fourth telescoping barrel 73 in the optical axis direction 0, but do not rotate.

The third telescoping barrel (i.e., second linear movable telescoping barrel) 14 is fitted inside the fourth telescoping barrel 73. The third telescoping barrel 14 is moved in the optical axis direction 0 by the rotation of the fourth telescoping barrel 73. The pin 14b passes through the above-noted linear guiding slot (not shown) formed on the linear guiding member 44 and is fitted in the leading groove 73c.

In the telescoping type zoom lens barrel of this third embodiment, when the driving gear 50 is rotated by a motor (not shown), the fourth telescoping barrel 73 is moved in the optical axis direction 0 while rotating. Then, the third telescoping barrel 14 is moved in the optical axis direction O while not rotating by means of the pin 14b guided by the leading groove 73c and the above-noted linear guiding slot (not shown) of the linear guiding member 44. At this time, the second telescoping barrel (i.e., first rotatable telescoping barrel) 15 is rotated by the rotation of the fourth telescoping barrel 73 and is moved in the optical axis direction 0 by the rotation of the male and female helicoids 15a and 14c. At the same time, the first telescoping barrel (i.e., first linear movable telescoping barrel) 22 is moved in the optical axis direction 0 while not rotating by the function of the male and female helicoids 22a and 15c and the function of the linear moving keys 16b and 18a. The first lens group L1 is moved together with the first telescoping barrel 22 in the optical axis direction 0 while the second lens group L2 is moved in the optical axis direction 0 while not rotating by the function of the linear moving keys 24a and the linear moving keys 16b and the function of the cam pins 24b and the cam grooves 15d. Accordingly, the front and rear lens groups L1 and L2 can move in the optical axis direction 0 while varying the distance therebetween in a predetermined relationship to effect zooming.

Figure 13:
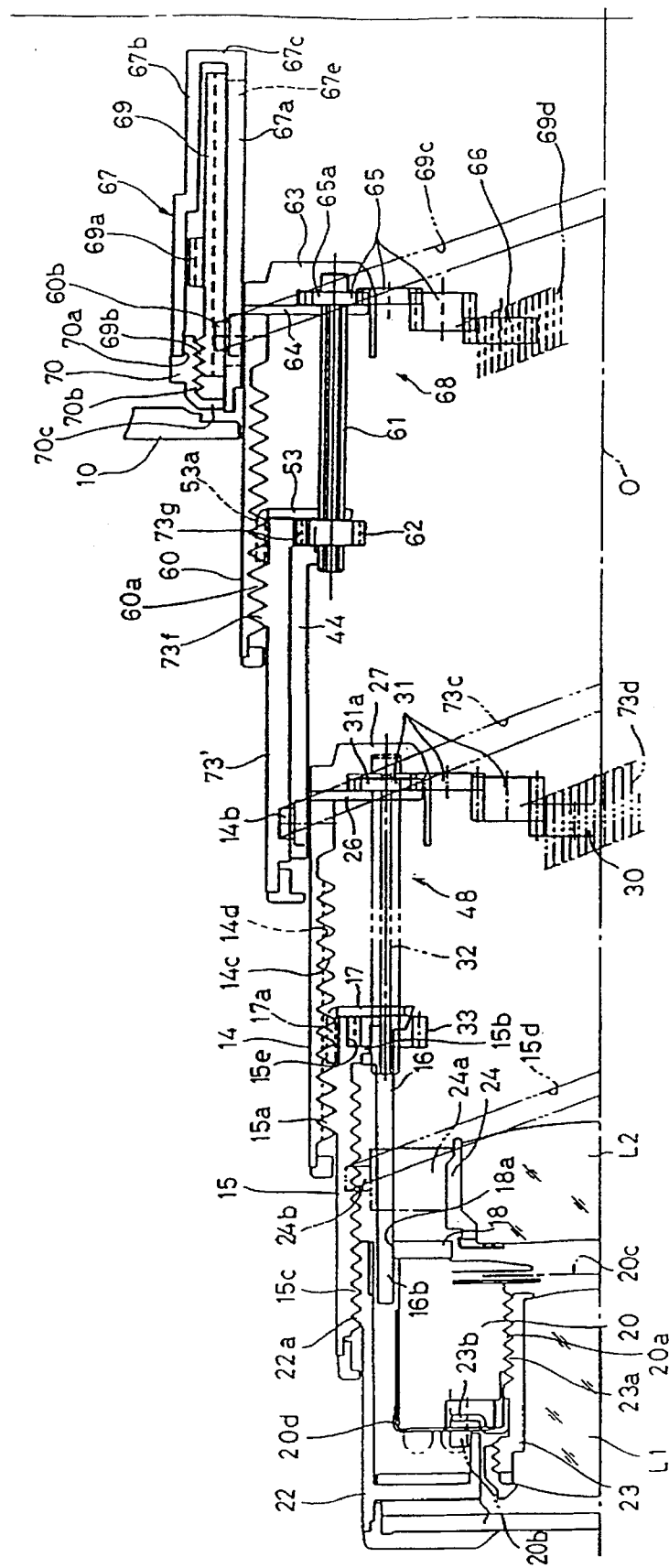

FIG. 13 shows a telescoping type zoom lens barrel having five telescoping barrels, according to the fourth embodiment of the present invention. In this fourth embodiment, the parts or members which are the same as those in the second and third embodiments are designated by the same numerals. In addition, the first, second, and third telescoping barrels 22, 15, and 14, including the associated members thereof, are the same as those in the second or third embodiment. A fourth telescoping barrel 73', in this fourth embodiment, is the same as the fourth telescoping barrel 73 of the third embodiment except that an inner gear 73g is formed on the inner periphery at the rear end of the fourth telescoping barrel 73' in place of the outer gear 73e of the fourth telescoping barrel 73.

In the fourth embodiment, a stationary barrel 67 fixed to the camera body 10 is provided in place of the stationary barrel 52 of the third embodiment. Moreover, a rotatable barrel (i.e., driving barrel) 69 is provided inside the stationary barrel 67 in a manner such that the movement of the rotatable barrel 69 in the optical axis direction 0 is prevented. Furthermore, a fifth telescoping barrel (i.e., third linear moving barrel) 60 is provided which is supported by the rotatable barrel 69. The fourth telescoping barrel 73' is engaged through a screw thread with the fifth telescoping barrel 60. The structure of the stationary barrel 67, rotatable barrel 69, and fifth telescoping barrel 60 is similar to that of the stationary barrel 11, rotatable barrel 12, and third telescoping barrel 14 of the second embodiment.

The male helicoid 73f of the fourth telescoping barrel 73' meshes with a female helicoid 60a which is formed on the inner periphery of the fifth telescoping barrel 60. The key portion 53a of the linear guiding plate 53 is fitted in a linear guiding groove (not shown) formed on the inner periphery of the fifth telescoping barrel 60. Thus, the fourth telescoping barrel 73' is rotatable with respect to the fifth telescoping barrel 60 and the rotation of the linear guiding member 44 and the linear guiding plate 53 with respect to the fifth telescoping barrel 60 is prevented. Accordingly, when rotated, the fourth telescoping barrel 73' is moved in the optical axis direction 0 while rotating via the male and female helicoids 73f and 60a while the linear guiding member 44 and the linear guiding plate 53 move together with the fourth telescoping barrel 73' in the optical axis direction 0 while not rotating. A pin 60b which passes through a linear guiding slot 67e and is fitted in a leading groove 69c is fixed to the outer periphery of the fifth telescoping barrel 60.

The stationary barrel 67 includes an inner barrel 67a, an outer barrel 67b, and a connecting wall 67c which connects the rear end of the inner barrel 67a with the rear end of the outer barrel 67b. The rotatable barrel 69 is rotatably placed between the outer and inner barrels 67a and 67b. The above-noted linear guiding slot 67e which extends parallel to the optical axis 0 is formed on the inner barrel 67a. A gear portion 69a which extends in a circumferential direction of the rotatable barrel 69 is formed on the outer periphery of the rotatable barrel 69. A minute-pitch male screw portion 69b is formed on the outer periphery of the rotatable barrel 69 at the front end thereof. The above-noted leading groove 69c which inclines with respect to a circumferential direction of the rotatable barrel 69 and an inner gear 69d which extends parallel to the leading groove 69c are formed on the inner periphery of the rotatable barrel 69. A supporting ring 70 is fixed to the front ends of the inner and outer barrels 67a and 67b. The supporting ring 70 is similar to the supporting ring 13 of the second embodiment. The supporting ring 70 includes an engaging portion 70a which comes in contact with the inner periphery of the outer barrel 67b, a female screw portion 70b which is engaged with the male screw portion 69b, and a contacting portion 70c which comes in contact with the outer periphery of the inner barrel 67a. The supporting ring 70 is biased toward the stationary barrel 67 by a biasing member (not shown), so that the position of the supporting ring 70 with respect to the stationary barrel 67 is maintained. A slot (not shown) through which a pinion (not shown) is engaged with the gear portion 69a is formed on the outer barrel 67b. A slot (not shown) through which the pin 60b passes to fit in the leading groove 69c and through which the pinion 66 is engaged with the inner gear 69d is formed on the inner barrel 67a.

A driving mechanism which gives rotation to the fourth telescoping barrel 73' will be explained below. Basically, this driving mechanism basically transmits rotation of the rotatable barrel 69 to the fourth telescoping barrel 73'. Gear supporting plates 64 and 63 are fixed to a rear portion of the fifth telescoping barrel 60 by screws (not shown). The gear supporting plate 64 supports a pinion 66 which is engaged with the inner gear 69d of the rotatable barrel 69 in a rotatable manner. The pinion 66 is placed in a recess (not shown) which is formed on the rear end of the fifth telescoping barrel 60. A part of the tooth portion of the pinion 66 projects out of the outer periphery of the fifth telescoping barrel 60. Since the inner gear 69d of the rotatable barrel 69 is formed in a manner such that the inner gear 69d is parallel to the leading groove 69c, the engagement of the pinion 66 with the inner gear 69d is maintained even when the fifth telescoping barrel 60 is moved in the optical axis direction 0 by the rotation of the rotatable barrel 69. A gear train 65 that receives rotation from the pinion 66 is supported between the gear supporting plates 64 and 63. A final gear 65a of the gear train 65 is fixed on a rear portion of a rotation transmitting shaft 61 extending parallel to the optical axis 0. The rotation transmitting shaft 61 has a uniform noncircular-shaped cross section throughout its length.

A pinion 62 which is slidable on the rotation transmitting shaft 61 and rotatable together with the rotation transmitting shaft 61 is supported by the linear guiding plate 53 with the pinion 62 immovable in the optical axis direction with respect to the linear guiding plate 53. Thus, the pinion 62 moves together with the linear guiding plate 53 and the fourth telescoping barrel 73' in the optical axis direction 0. The pinion 62 is engaged with the inner gear 73g of the fourth telescoping barrel 73'. Accordingly, the rotation of the rotatable barrel 69 is transmitted to the fourth telescoping barrel 73' through a rotation transmitting mechanism 68 which includes the inner gear 69d, pinion 66, gear train 65, rotation transmitting shaft 61, pinion 62, and inner gear 73g, no matter where the fifth telescoping barrel 60 is located in the optical axis direction 0.

In the telescoping type zoom lens barrel of this fourth embodiment, when the rotatable barrel 69 is rotated by a motor (not shown), the fifth telescoping barrel 60 is moved in the optical axis direction 0 while not rotating by means of the pin 60b guided by the leading groove 69c and the linear guiding slot 67e. At this time, the fourth telescoping barrel 73' is rotated by the rotation of the rotatable barrel 69 and is moved in the optical axis direction 0 while rotating by the function of the male and female helicoids 73f and 60a. At the same time, the third telescoping barrel 14 is moved in the optical axis direction 0 while not rotating. At this time, the second telescoping barrel 15 is moved in the optical axis direction 0 while rotating by the rotation of the fourth telescoping barrel 73'. At the same time, the first telescoping barrel 22 is moved in the optical axis direction 0 while not rotating. The first lens group L1 is moved together with the first telescoping barrel 22 in the optical axis direction 0 while the second lens group L2 is moved in the optical axis direction 0 while not rotating by the function of the linear moving keys 24a and 16b and the function of the cam pins 24b and the cam grooves 15d. Accordingly, the front and rear lens groups L1 and L2 can move in the optical axis direction 0 while varying the distance therebetween in a predetermined relationship to effect zooming.

As can be seen from the foregoing, in the fourth embodiment of the present invention, the number of telescoping barrels may be more than five by repeating a similar mechanical structure, including the second and fourth telescoping barrels 15 and 13, and the rotatable barrel 69, which are all rotated, and the first, third, and fifth telescoping barrels 22, 14, 60, which are not rotatable but movable only in the optical axis direction 0.

We claim:

1. A zoom lens barrel having a plurality of lens groups which are moved with respect to one another in a predetermined path, comprising:

a driving barrel which rotates about an optical axis of said plurality of lens groups;

at least two rotating telescoping barrels which are moved in a direction of said optical axis while rotating about said optical axis by rotation of said driving barrel;

at least two linear movable telescoping barrels which are moved in said optical axis direction while not rotating about said optical axis by rotation of said driving barrel, wherein said at least two linear movable telescoping barrels support said plurality of lens groups such that said at least two linear movable telescoping barrels are movable in said optical axis direction with respect to said at least two linear movable telescoping barrels;

an inner-most telescoping barrel that is fitted inside one of said at least two rotating telescoping barrels which is closest to said optical axis among said at least two rotating telescoping barrels, wherein said inner-most telescoping barrel is moved in said optical axis direction by rotation of said one of said at least two rotating telescoping barrels with respect to said inner-most telescoping barrel; and lens group driving means for moving said plurality of lens groups in said optical axis direction by movement of said at least two rotating telescoping barrels in said optical axis direction.

2. A zoom lens barrel, comprising:

a rotatable barrel;

an outer telescoping barrel which is moved along an optical axis by rotation of said rotatable barrel without rotating about said optical axis;

an inner telescoping barrel which is engaged through a screw thread with said outer telescoping barrel and is moved along said optical axis when rotated about said optical axis;

at least two movable lens groups which are moved along said optical axis by a rotation of said inner telescoping barrel; and, rotation transmitting means for transmitting rotation of said rotatable barrel to said inner telescoping barrel, wherein said inner telescoping barrel, said outer telescoping barrel and said rotatable barrel are concentrically arranged in this order in a radial direction from said optical axis.

3. The zoom lens barrel of claim 2, wherein said rotation transmitting means comprises:

a first pinion rotatably supported on said outer telescoping barrel in a rotatable fashion with a portion of said first pinion being positioned on an outer periphery of said outer telescoping barrel;

a first inner gear which is formed on an inner periphery of said rotatable barrel such that said first inner gear inclines with respect to a circumferential direction of said rotatable barrel so that said first pinion is always engaged with said first inner gear;

a second inner gear formed on an inner periphery of said inner telescoping barrel;

a second pinion supported on said inner telescoping barrel so that said second pinion is always engaged with said second inner gear; and a gear mechanism which transmits rotation of said first pinion to said second pinion, regardless of a relative position of said outer telescoping barrel with respect to said inner telescoping barrel.

4. The zoom lens barrel of claim 3, wherein said gear mechanism includes a gear train and a rotation transmitting shaft which extends parallel to said optical axis and on which a final gear of said gear train is fixed, wherein said first pinion is engaged with said gear train, and further wherein said second pinion is slidably fitted on said rotation transmitting shaft with said second pinion rotatable together with said rotation transmitting shaft.

5. The zoom lens barrel of claim 2, wherein said at least two moveable lens groups are supported by said inner telescoping barrel.

6. A zoom lens barrel, comprising:

a stationary barrel;

a movable lens group including at least front and rear lens groups, said rear lens group being guided along an optical axis without rotating about said optical axis;

an outer telescoping barrel which moves along an optical axis with respect to said stationary barrel;

an inner telescoping barrel which moves along said optical axis with respect to said outer telescoping barrel; and a front lens group supporting barrel which moves along said optical axis with respect to said inner telescoping barrel, wherein said front lens group supporting barrel, said inner telescoping barrel, said outer telescoping barrel and said stationary barrel are concentrically arranged in this order in a radial direction from said optical axis, and wherein said front lens group is supported by said front lens group supporting barrel and said rear lens group is supported by said inner telescoping barrel, and further wherein said front lens group supporting barrel and said rear lens group are each moved without rotating about said optical axis by a rotation of said inner telescoping barrel.

7. A zoom lens barrel, comprising:

at least two rotatable telescoping barrels and two linear movable telescoping barrels which are concentrically and alternately arranged, wherein said at least two rotatable telescoping barrels are each moved along an optical axis while rotating about said optical axis when rotation is transmitted thereto, wherein said at least two linear movable telescoping barrels are each movable along said optical axis and not rotatable about said optical axis, each of said at least two linear movable telescoping barrels being movable along said optical axis by rotation of one of said at least two rotatable telescoping barrels which is adjacent to said each of said at least two linear movable telescoping barrels;

rotation transmitting means which transmits rotation of one of said at least two rotatable telescoping barrels to another of said at least two rotatable telescoping barrels; and a movable lens group including at least a front lens group and a rear lens group, wherein said front and rear lens groups are supported by one of said at least two rotatable telescoping barrels which projects farthest among said at least two rotatable telescoping barrels and one of said at least two linear movable telescoping barrels which projects farthest among said at least two linear movable telescoping barrels.

8. The zoom lens barrel of claim 7, further comprising a driving barrel which rotates about said optical axis, wherein said driving barrel transmits rotation to said one of said at least two rotatable telescoping barrels.

9. A zoom lens barrel, comprising:

an outermost rotatable telescoping barrel which moves along an optical axis while rotating about said optical axis when rotation is transmitted thereto;

a outer linear movable telescoping barrel which is moved along said optical axis without rotating about said optical axis by a rotation of said outermost rotatable telescoping barrel;

a inner rotatable telescoping barrel which moves along said optical axis while rotating about said optical axis when rotation is transmitted thereto;

an innermost linear movable telescoping barrel which is moved along said optical axis without rotating about said optical axis by rotation of said second innermost rotatable telescoping barrel; and rotation transmitting means which transmits said rotation of said outermost rotatable telescoping barrel to said inner rotatable telescoping barrel.

10. The zoom lens barrel of claim 9, further comprising a movable lens group which includes at least a front lens group and a rear lens group, wherein said front and rear lens group are supported by said innermost linear moveable telescoping barrel and said inner rotatable telescoping barrel, respectively.

* * * * *

UNITED STATES PATENT AND TRADEMARK OFFICE
CERTIFICATE OF CORRECTION

PATENT NO. : 5,659,810
DATED : August 19, 1997
INVENTOR(S) : H. NOMURA et al.

It is certified that error appears in the above-identified patent and that said Letters Patent is hereby corrected as shown below:

At column 16, line 45 (claim 9, line 14) of the printed patent, change "second innermost", to ---inner---.

Signed and Sealed this

Second Day of February, 1999

Attest:

Attesting Officer

Acting Commissioner of Patents and Trademarks